US011030582B2

(12) United States Patent
Park et al.

(10) Patent No.: US 11,030,582 B2
(45) Date of Patent: *Jun. 8, 2021

(54) RANKING NOTIFICATIONS BASED ON RULES

(71) Applicant: Comcast Cable Communications, LLC, Philadelphia, PA (US)

(72) Inventors: Wendy H. Park, Bedminster, NJ (US); Julie A. Kim, Newtown, PA (US); Mark A. Coblitz, Wayne, PA (US); James Poder, Cheltenham, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,872

(22) Filed: Sep. 5, 2019

(65) Prior Publication Data
US 2020/0242556 A1 Jul. 30, 2020

Related U.S. Application Data

(63) Continuation of application No. 13/528,001, filed on Jun. 20, 2012, now Pat. No. 10,453,030.

(51) Int. Cl.
*G06F 15/16* (2006.01)
*G06Q 10/10* (2012.01)

(52) U.S. Cl.
CPC ................... *G06Q 10/10* (2013.01)

(58) Field of Classification Search
USPC ....... 709/206, 203, 217, 219, 223, 224, 226, 709/228, 230, 232, 238; 455/412.2; 381/58
See application file for complete search history.

(56) References Cited

U.S. PATENT DOCUMENTS

| 6,658,485 | B1 | 12/2003 | Baber et al. |
| 7,034,691 | B1 | 4/2006 | Rapaport et al. |
| 8,031,726 | B2 | 10/2011 | Ansari et al. |
| 8,516,016 | B2 | 8/2013 | Park et al. |
| 8,707,201 | B1* | 4/2014 | Aradhye ............... H04L 51/26 715/789 |

(Continued)

FOREIGN PATENT DOCUMENTS

JP 11272585 10/1999

OTHER PUBLICATIONS

Web Page: http://web.archive.org/web/20081001191619/http://www.cnet.com/1990-10839_1-6224211-1.html; dated Oct. 1, 2008; printed on Jun. 20, 2012, 3 pages.

(Continued)

*Primary Examiner* — Quang N Nguyen
(74) *Attorney, Agent, or Firm* — Banner & Witcoff, Ltd.

(57) ABSTRACT

System and methods for enhancing user productivity by integrating multiple services and providing a centralized output to a user as disclosed. A message notification server may receive various notifications, and may dynamically prioritize them for a ranked order presentation to users. The system may automatically re-rank the notifications based on changed conditions or to present messages of greatest urgency or importance. The system may also store sender-specific sets of rules, governing how notifications are to be handled for different application servers or services.

20 Claims, 17 Drawing Sheets

(56) References Cited

U.S. PATENT DOCUMENTS

| | | | |
|---|---|---|---|
| 8,719,861 B2 | 5/2014 | McCarthy et al. | |
| 8,924,493 B1* | 12/2014 | Yeskel | H04L 12/1813 709/206 |
| 9,614,880 B1* | 4/2017 | Davis | H04L 65/403 |
| 9,743,381 B1* | 8/2017 | Alam | A61B 5/048 |
| 2002/0087649 A1 | 7/2002 | Horvitz | |
| 2003/0046421 A1 | 3/2003 | Horvitz et al. | |
| 2003/0105827 A1* | 6/2003 | Tan | H04L 67/306 709/206 |
| 2004/0010808 A1 | 1/2004 | deCarmo | |
| 2005/0071509 A1 | 3/2005 | Faber et al. | |
| 2006/0235933 A1 | 10/2006 | Baluja et al. | |
| 2008/0092199 A1 | 4/2008 | McCarthy et al. | |
| 2008/0165789 A1 | 7/2008 | Ansari et al. | |
| 2009/0150507 A1 | 6/2009 | Davis et al. | |
| 2009/0326340 A1 | 12/2009 | Wang et al. | |
| 2010/0056112 A1 | 3/2010 | Dupont et al. | |
| 2010/0121925 A1 | 5/2010 | Champlin-Scharff et al. | |
| 2010/0235367 A1 | 9/2010 | Chitiveli et al. | |
| 2011/0173323 A1 | 7/2011 | Fimbel et al. | |
| 2011/0316688 A1 | 12/2011 | Ranjan et al. | |
| 2012/0011126 A1 | 1/2012 | Park et al. | |
| 2012/0143798 A1 | 6/2012 | Sundelin et al. | |
| 2012/0258691 A1* | 10/2012 | Baer | H04M 1/72563 455/412.2 |
| 2012/0268269 A1 | 10/2012 | Doyle | |
| 2013/0067014 A1 | 3/2013 | Lau et al. | |
| 2015/0026325 A1* | 1/2015 | Rheinheimer | H04W 4/12 709/223 |
| 2015/0350146 A1* | 12/2015 | Cary | H04L 67/2823 709/206 |
| 2016/0150338 A1* | 5/2016 | Kim | G08B 1/08 381/58 |
| 2016/0231902 A1 | 8/2016 | Sirpal et al. | |
| 2017/0177200 A1* | 6/2017 | Jeong | G06F 3/04842 |
| 2018/0131655 A1* | 5/2018 | Carbune | H04L 67/20 |
| 2018/0204632 A1* | 7/2018 | Kang | G06F 21/6245 |
| 2019/0149888 A9 | 5/2019 | Sirpal et al. | |
| 2020/0012423 A1* | 1/2020 | Cinek | H04M 1/72597 |

OTHER PUBLICATIONS

Web page: http://www.apple.com/iphone/built-in-apps/app-store.html; not dated, printed on Jun. 9, 2012, 3 pages.

Web page: http://www.engadget.com/2009/01/23/verizon-hub-landline-slayer-officially-unveiled; dated Jan. 23, 2009, printed Jun. 20, 2012, 4 pages.

Author unknown. "web page monitoring monitor changes webpages changedetect". Updated May 10, 2009. Printed Jul. 20, 2009. 2 pages. Accessed at http://www.changedetect.com.

Douglas Aberdeen, Ondrej Pacovsky, Andrew Slater. "The Learning Behind Gmail Priority Inbox". LCCC: NIPS 2010 Workshop on Learning on Cores, Clusters and Clouds. Dec. 2010.4 pages.

Author unknown. "Xfinity Home Security: User Manual". iControl Networks: Jun. 4, 2010. 19 sheets of front and back covers and pages No. 1-32.

Joseph L. Flatley. "Xfinity Home Security makes home monitoring and management Comcastic". posted Jun. 9, 2011 6:01PM. Archived Jun. 12, 2011. 4 pages. Available online: https://web.archive.org/web/20110612121920/ http://www.engadget.com/2011/06/09/xfinity-home-security-makes-home-monitoring-and-managament-comca/.

Todd Spangler. "Cracking the Home Security Code". Multichannel News. NewBay Media: Jun. 13, 2011. 10 pages. Available online: http://www.multichannel.com/news/policy/cracking-home-security-code/264890.

Brian W. Kernighan and Dennis M. Ritchie. "The C Programming Language, Second Edition". Chapter 1, Section 1.1: 2 pages. Prentice Hall: Upper Saddle River, NJ, Mar. 22, 1988.

The SpamAssassin Project. Concatenated documentation files (HTML versions), with prepending file listing; version 3.2.x. Jun. 12, 2008. 205 total pages.

Bailey-Hughes, Brenda. "The Administrative Assistant". Boston, MA, USA: Course Technology / Cengage Learning, Dec. 1997.

Machine translation of H11-272585 unexamined Japanese application for patent. 28 pages.

Author unknown. "rank, v.3" Oxford English Dictionary, 3rd ed. Dec. 2008. 3 pages.

Daniel Jacobson; Greg Brail; Dan Woods. "APIs: A Strategy Guide". O'Reilly Media, Inc. Dec. 17, 2011. Section 1.4, 2 printed pages.

\* cited by examiner

RANKING NOTIFICATIONS BASED ON RULES

RELATED APPLICATIONS

The present application claims priority to, and is a continuation of, U.S. patent application Ser. No. 13/528,001, filed Jun. 20, 2012, now U.S. Pat. No. 10,453,030 B2, issued Oct. 22, 2019, entitled "Ranking Notifications Based on Rules", which is hereby incorporated by reference in its entirety for all purposes.

BACKGROUND

Today, we are faced with a wide array of services to enhance our lifestyle. Electronic mail (email), text messaging, phone calls, home security information, television content and announcements, computer provided information and pop-ups, and a variety of other useful services often compete for our attention. Managing the array, however, can be difficult, as each service often requires input from the user, and the user sometimes misses important notifications. There is a constant need to improve the service experience such that the benefits to the consumer are maximized while the burden on the consumer is minimized.

SUMMARY

Some aspects described herein generally relate to a system that integrates multiple services in a centralized user interface. The system may be based in the home but can integrate services from all aspects of the user's life. Some services may relate to events occurring in the home; other services relate to events outside the home. Services may be organized into applications, which can be hosted on servers using a cloud-based architecture. The user can opt-in to services for free or by purchasing or renting the applications. Various service applications can be used, such as home security services, personal news and information delivery services, electronic commerce services, and others. Reports from the services can be gathered at a centralized interface, similar to a user's electronic mail inbox, and provided to users. In some embodiments, each application can first register itself with a manager of the user's inbox, and can provide a set of rules that will govern how incoming alerts from the application's source are to be handled.

Information delivery and user input can be made by any device. For example, a user can view and respond to information through a variety of user devices including wall panels, personal computers, laptop computers, tablet computers, televisions (TVs), display monitors, cell phones, smartphones, etc. In some embodiments, the user device can be a portable home security control panel. The device can be portable, and the user need not be physically in the home to obtain and respond to information provided by the system. In some embodiments, the centralized user interface provides for opted-in, personalized events and notifications rather than having to search for updates providing added convenience and ease-of-use to the user.

Notifications from the various services can be prioritized based on a variety of factors, such as sender or recipient geographic location, time of date, message content, etc. A recipient user's historical behavior and past treatment of similar notifications can also factor in to the prioritization of a currently-received notification. The prioritization can result in a ranked presentation of notifications to users, and the ranked presentation may be periodically re-ranked as time and other conditions change.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

The features described herein generally relate to integrating multiple services in a centralized user interface, which allows the user to monitor and control the services via software applications. Integrating the services provides enhanced efficiency and convenience to the user. The system is "always on" providing the user with timely updates in response to notifications from services. The updates are provided as push notifications, rather than pull notifications. The user therefore need not visit a website to obtain updated information. The centralized nature of the features herein means that communications to and from the system need not be inputted or transmitted through a specialized device.

Mechanics of Content Delivery

In some embodiments content is communicated directly to a device, which may be substantially and permanently located inside the residence or business, such as a desktop computer or home security control panel, or the content is communicated to a mobile device such as tablet computers, cell-phone, smart phone, or PDA (personal data assistant) or the like. In some cases, the same content is delivered to multiple types of devices. The service and/or the user may select which devices the content is delivered to.

Figure 1:
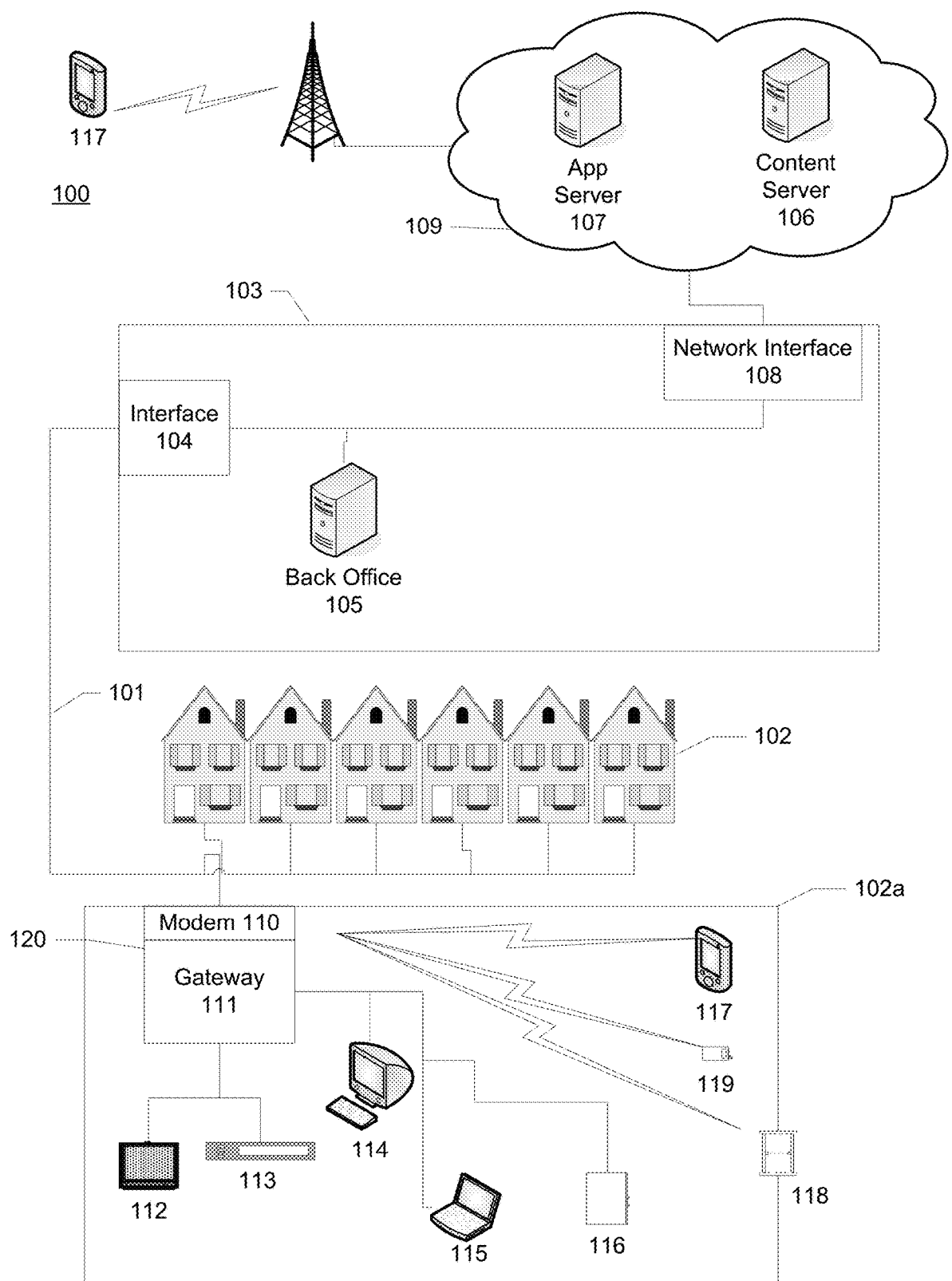
FIG. 1 illustrates an example communication network on which various features of the disclosure may be implemented.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, central office, a processing facility, etc.). The local office 103 may transmit downstream information signals onto the links 101, and each premises 102 may have a receiver used to receive and process those signals. The geographic location of the local office 103 can vary, and the local office 103 may be proximate to a user's neighborhood in some embodiments, while in other embodiments, the local office 103 may be remotely located at a centralized location. The various servers may be located anywhere, and their location need not be relevant to a user (e.g., the servers may be in the "cloud").

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, geographic area, etc.). In some embodiments, homes connected to a termination system (TS), such as a modem termination system (MTS), may form a local premises access network.

The local office 103 may include an interface 104, such as a termination system (TS) (e.g., a cable modem termination system (CMTS) in an example of an HFC-type network), which may be a computing device configured to manage communications between devices on the network of links 101 and backend devices such as servers 105 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to other devices on the network such as a cellular telephone network and its corresponding cell phones. Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions such as billing, reporting, and subscriber management 400 to deliver data and/or commands to the various premises 102 in the network (or more specifically, to the devices in the premises 102 that are configured to detect such notifications). In some embodiments, application servers 107 (405) and content servers 106 are located in the cloud 109. The local office 103 may also include a content server. The content server 106 may be one or more computing devices that are configured to provide content to users, who may be, for example, in the homes. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also communicate with one or more application servers 107 maintained in the cloud 109. An application server 107 may be a computing device configured to offer any desired service, and may run various languages and operating systems (e.g., servlets and JSP pages running on Tomcat/My SQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include an interface 120, which may comprise a device, such as a modem 110 (or another receiver and/or transmitter device suitable for a particular network), which may further include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the home to communicate with the local office 103 and other devices beyond the local office. The gateway 111 and the modem 110 may serve together as an IP gateway 410. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, tablet computers, PDA, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 3G, WiMax, LTE, Bluetooth interfaces, and others. In some embodiments, the system uses ZigBee and Z-Wave compliant devices.

Examples of additional appliances relating to on-site services are also shown. Home-security devices may be attached to windows, doors, or may have intruder detection capabilities, such as window alarm sensors 118, motion detectors, etc. Other appliances may also be present in premises and configured to communicate on the local network. For example, appliances such as microwaves 119 and refrigerators 116 may communicate with the system and be controlled by the system. Additional devices may include medical devices such as scales, blood pressure cuffs, and glucose meters, medication monitors, as well as energy devices such as electric meters, current sensors and lighting controllers (not shown). The system may also be controlled by a portable home security control panel, which may be configured to communicate on the local network.

Figure 2:
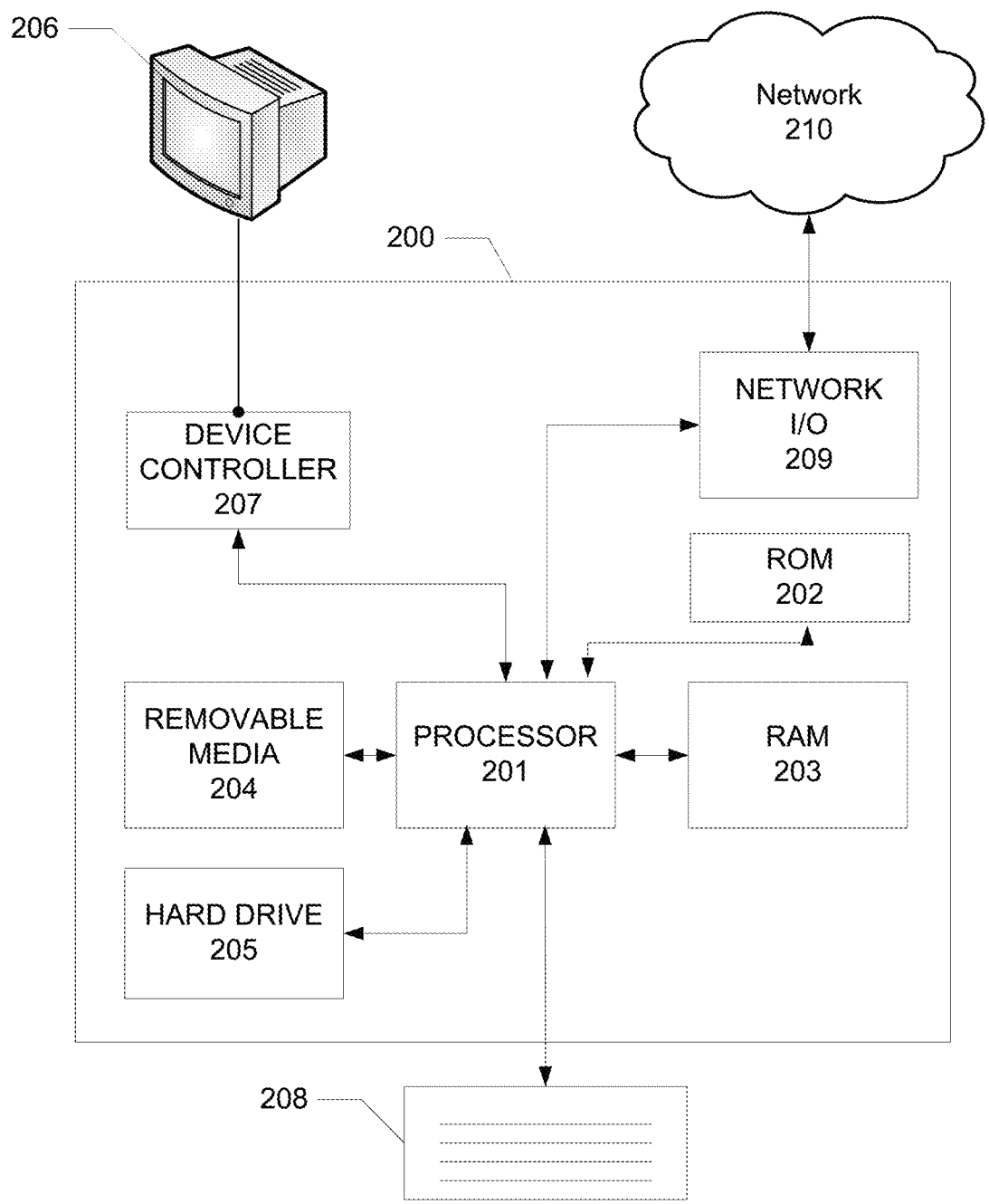
FIG. 2 illustrates an example hardware and software architecture that can be used to implement any of the various features of the disclosure.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOC SIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the local office of an information distribution or access network may transmit information downstream to various user devices. The transmitted information may include content (e.g., audio, video, Internet data, etc.) for consumption (e.g., playback, viewing, listening, display, storage, etc.) by a user via user equipment, such as a gateway interface device (e.g., gateway interface device 111 of FIG. 1) and/or other computing device (e.g., televisions 112, additional STBs 113, personal computers 114, laptop computers 115, wireless devices 117 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

The messaging platform may use push technology, whereby events are "pushed" to subscribers as and when they are generated. This is different from many Internet applications that require the subscriber to "pull" data from a server (browsing).

As will be described below, an application server 107 may be used to carry out a life management service for a user. The server 107 may receive notifications from various other services in the user's life, and can organize them for presentation to the user via an Internet web page showing a notification inbox, such as an electronic email inbox. For example, the server may receive notifications that milk in the user's refrigerator is going bad, that a drug prescription for the user is about to need refilling, that the user's home security system is armed, and any other desired type of notification. These various notifications may arrive using any desired format, such as a push notification, and FIG. 3 below illustrates an example process for receiving and handling notifications.

Figure 3:
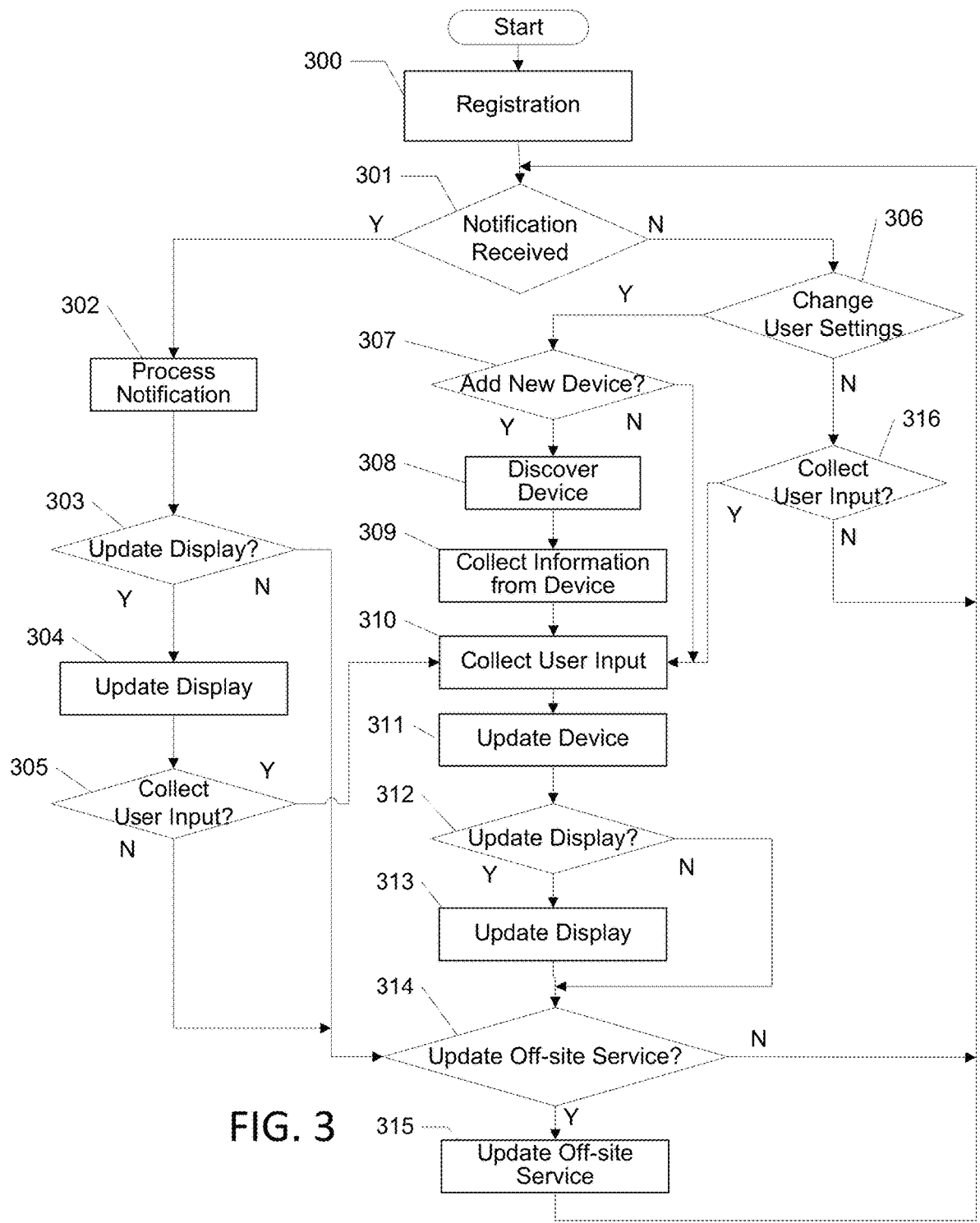
FIG. 3 illustrates an example workflow which shows how various features of the disclosure may be implemented.

FIG. 3 provides an example of workflow for how a life management server may receive and process notifications from or to a user's device or services. In step 300, the user may register with the life management service or server which may be any computing device configured to implement all or a portion of the disclosed methods. The registration may include creating an account, login identification, password, and identification of services to which the user wishes to subscribe. Alternatively, registration may comprise casual access by a user, without creating an account. Each registered service may, in turn, have its own application server operating to support it, and can transmit notifications to the life management server as needed. Identifying these services may involve, for example, providing the life management server with an identification of the uniform resource locator (URL) for the particular service (e.g., the URL for the user's pharmacy), as well as information identifying the user to that service (e.g., the user's login ID and password for the pharmacy server, which may be different from the user's login ID and password for the life management server). This registration may also include the life management server storing in memory, for each registered application, a set of rules governing how notifications from and to the application's server are to be handled. For example, a weather service may define rules indicating how its weather alerts should be delivered to the user (e.g., establishing a higher default priority, whether to bother with the alert if the user is already out of the home, specifying the removal of an alert if a weather condition subsides, etc.). A different application server, such as a movie review server, might have a different set of rules (e.g., prioritizing an incoming new movie alert based on whether the new movie matches a viewer profile of the user, or is in a genre that the user regularly views, etc.). In general, the rules may identify a criterion (e.g., email sender, time of day, movie type, message type, user location, etc.), condition (e.g., sender is movie recommender, time of day is afternoon, movie is comedy, user is away from home, etc.), and a resulting treatment upon satisfaction (or failure) of a condition (e.g., deliver message with high priority, delete message automatically, etc.). These various rules may be negotiated in advance between the life management service and each corresponding application or notification service, and can contain disparate criteria. In some instances, the rules for two different application services can use entirely different types of criteria. For example, a weather application might only use weather alert status to determine treatment of weather messages, while a movie recommendation application might not use the weather alert status at all, and instead may use different criteria such as user viewing habits. Through this registration, the various services may become associated with the life management service and the user.

In step 301, the life management server may determine whether it has received a notification for the user (e.g., a push notification). Notifications may be received in a variety of formats such as email, SMS text, http post, sensor update (for example, in response to a triggering event, the exceeding of a pre-set threshold, or exceeding a specified time), IM RSS, or content providers' APIs. Outbound notifications may use the native formats of the receiving devices. For example, cell phones may use SMS, email, or APNS (APPLE™ push notification service) for an APPLE™ device. In-application messaging may use XMPP messaging over the IMS infrastructure or using SIP/SIMPLE (similar to XMPP). The notification can come from an off-site source (e.g., as an Internet communication or e-mail from a remote source at a different premises from the user's premises), or an on-site source (e.g., as a local network communication from the user's refrigerator located at the user's premises). If a notification is received, the life management server may proceed to step 302 and process the notification. Notification processing may include various steps depending on the service; for example, processing may include steps of identifying the service from which the notification was sent, identifying the user from which the notification was sent, and identifying the content of the notification. This processing may include identifying the sender of the message and determining whether the sender has established rules for the treatment of the incoming message, and in response to determining that such rules have been established, the processing can include checking to determine what conditions (if any) in the rules are satisfied by the message, and conducting the responsive treatment.

After processing the notification 302 (e.g., a push notification), the system determines 303 what content, if any, should be presented to the user on one or more displays 304 as a response to the received notification 302. In some embodiments, notifications will relate to actions (e.g., updating services in the background or receipt of new news stories or coupon postings) that may not require display to a user. Optionally, the user may input information 305 (addressed further below).

If no incoming notification has been received in step 301, the system may proceed to step 306, and determine whether the user has requested to change any parameters of user settings. Changed user settings and processing push notifications may involve for example, adding a new device 307. The system performs a discover device step 308 to detect a new device. Devices may be discovered using any suitable communications network, using Z-wave and Zigbee protocols; for example. Once detected, the system collects information from the device or elsewhere, e.g., a web page or database, to integrate the device with the system 309, such as adding the device's identification to a registry of devices serviced by the system. Optionally, the user may input information to update device parameters with user-specific information 311, such as account logins, passwords, service preferences, presence information, or a device-specific method of communication. In some embodiments, the input may be manually entered; in other embodiments, the information may be obtained automatically; for example, by extracting information from a push notification 301-302. The new information may require updating the device 311. The display may also be updated 312-313. Optionally, an off-site service may be updated 314-315. The user may access the system at any time by inputting data 316; for example, to switch from one application to another, or to access different application interfaces from the centralized inbox application.

Figure 4:
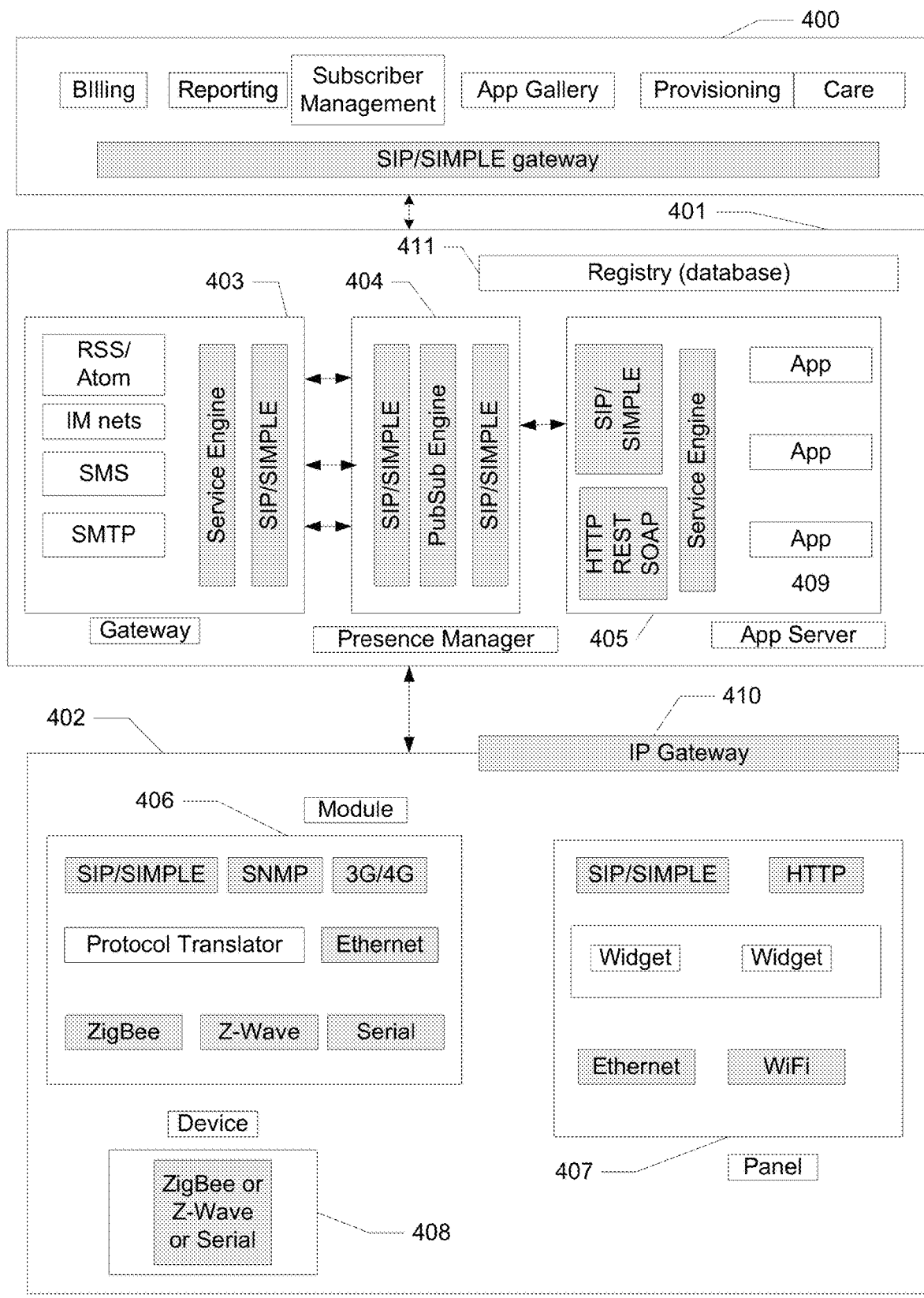
FIG. 4 illustrates another view of a communication network on which various features of the disclosure may be implemented.

The system may have an infrastructure as described in FIG. 4. A back office 400 (105), contained in a local office 103, may comprise organizational servers that perform functions such as billing, reporting, and subscriber management. The back office 400 (105) may also host an application gallery that may identify one or more applications that are available to the user. The back office 400 (105) communicates with the application server 405 (107) and content servers 106 via SIP/SIMPLE messaging. The system may use instant messaging (IM), short message service (SMS), and Really Simple Syndication (RSS), and/or Atom, SMPT, protocols to supply content via gateway 403.

The cloud 401 may also contain computing devices such as a presence manager 404 and an application server 405. The presence manager (404) hosts the PubSub (publish/subscribe, e.g., RSS) engine and the application server hosts the Applications. Communications between the gateway, server and engine can be via SIP/SIMPLE protocols. The content may be delivered from content servers to the home 402 using the home gateway (410; see also 110-111). A Consumer or Customer Premises Equipment (CPE) module 406 may serve as the relay between the servers and the registered devices (408 and see 117-119). The module may interact with devices using various protocols, such as Z-Wave, ZigBee and serial and parallel interface protocols.

Communications between a module and a device may use, for example, a standard XML format. The module reports events generated within the home to the cloud. Each event is standardized into XML format, encapsulated into a SIMPLE payload then addressed to the presence manager 404. The module receives messages generated by the applications and directed to the registered devices. On receipt, the module translates the messages to the appropriate device control protocol. Messages sent from the module to the cloud may be encrypted (SSL, or HTTPS, for example).

Devices 408 may be discovered (see also 308) by the module 406 using a variety of communication approaches, including Z-Wave, ZigBee, and IEEE 802.11-based discovery protocols. Discovered information includes MAC addresses, make/model, type and capabilities of the device. The module regulates the ability of devices to contact the services through a registration process. Only registered devices may contact the services. Devices may also be de-registered by the module. Multicast or unicast communication channels can be established for each of the services used by the life management system, and the various services can use these channels to transmit corresponding information between a service's server and the user's life management server.

Information about the device configuration may be stored locally and synchronized automatically with a cloud registry database via the SIMPLE protocol. The module contains additional functionality for management, including an admin application for installation and configuration, signed firmware and software, downloadable and upgradeable software. The admin functions are handled via SIMPLE and SNMP protocols. The SNMP interface also allows remote monitoring of module performance. The module supports IPv6, IPv4 (dual stack), Ethernet (RJ45) connectivity with DOCSIS modem for a primary connection. Other protocols such as IEEE 802.11, 3G/WiMax/LTE, and the like may be used as back-up communication approaches.

User devices that contain the user interface may also be known as panels, as display devices, or as displays. Examples of panels include phones, cell phones, smartphones, PDAs, computer displays, laptops, tablet computers, and TVs (407 and see 112-116). On a user interface, each application may be represented by a widget. Widgets are onscreen elements (e.g., icons) that correspond to installed applications that may be accessed by a user device. The application supporting each widget communicates with its corresponding server via SIP/SIMPLE protocol and supports streaming voice and full screen, full motion video as well as IPv6, IPv4, and solutions for NAT traversal in an IPv4 environment such as STUN, TURN, and ICE.

The presence manager 404 hosts the PubSub engine and keeps track of open channels, publishers, and subscribers. When an event is published to a channel, the presence manager notifies subscribers of those events through a protocol, for example, the SIMPLE protocol. The presence manager includes an open interface to allow third parties to create, manage, and maintain channels.

The applications may interface via the PubSub engine to publish and subscribe to event feeds. Applications may allow other communication interfaces such as HTTP, REST, and SOAP. The parameters for settings and preferences can be user-configured for each application. An application may be configured differently for each user device and for each user on the same device. The settings and preferences are stored on the application itself. Parameters may be changed at any time and may rely on PubSub channels to communicate from the client to the server. Optionally, an application may have one or more widgets to enhance the user interface.

Applications may use a broad range of connectivity options to connect to external networks (e.g., IM, email, SMS, and RSS, and/or Atom). Communications between these gateways and applications is implemented through PubSub channels to avoid point-to-point interfaces between applications and gateways.

Optionally, the cloud may also contain a subscriber data registry 411, which may contain subscriber data that can be provided to applications needing access to such data. The registry can also provide a synchronizing function. The registry synchronizes device configuration data stored in modules and also synchronizes provisioning and billing systems to keep track of subscribers and their subscriptions.

Applications may be catalogued and displayed in the application gallery, which may be hosted on the back office 400. Applications may be sold a la carte or in bundles, or they may be distributed free of charge to the user. Optionally, prices charged may be one-time or a recurring charge, providing for subscriptions that can expire. The system provides for micro-payments e.g., pay-per-use, and e-wallets.

The system integrates services and applications from various sources. Sources may be on-site, e.g., from devices and users arising out of the residence or business location. For example, the system may integrate events from electronic home devices such as door-locks, thermostats, meters, switches, and household appliances. On-site services include monitoring and control of household features such as energy, lighting, heating and air-conditioning (HVAC), security devices such as cameras and motion detection. The motion detection service can be used to determine whether more occupants are present than expected, indicating burglary, and also to be used to determine mobility of persons in each room. Mobility determining is particularly advantageous where an elderly person lives alone.

The system also integrates services from off-site. Off-site services are services with content substantially supplied from outside the ISP or residence or business location. For example, off-site services may include pharmacies, schools, household appliance vendors, grocery stores, weather report services, traffic report services, community notices, sports reports and the like. Each of these can provide user-relevant content to the user. For example, household appliance vendors can keep users informed of any potential recall.

Figure 10A:
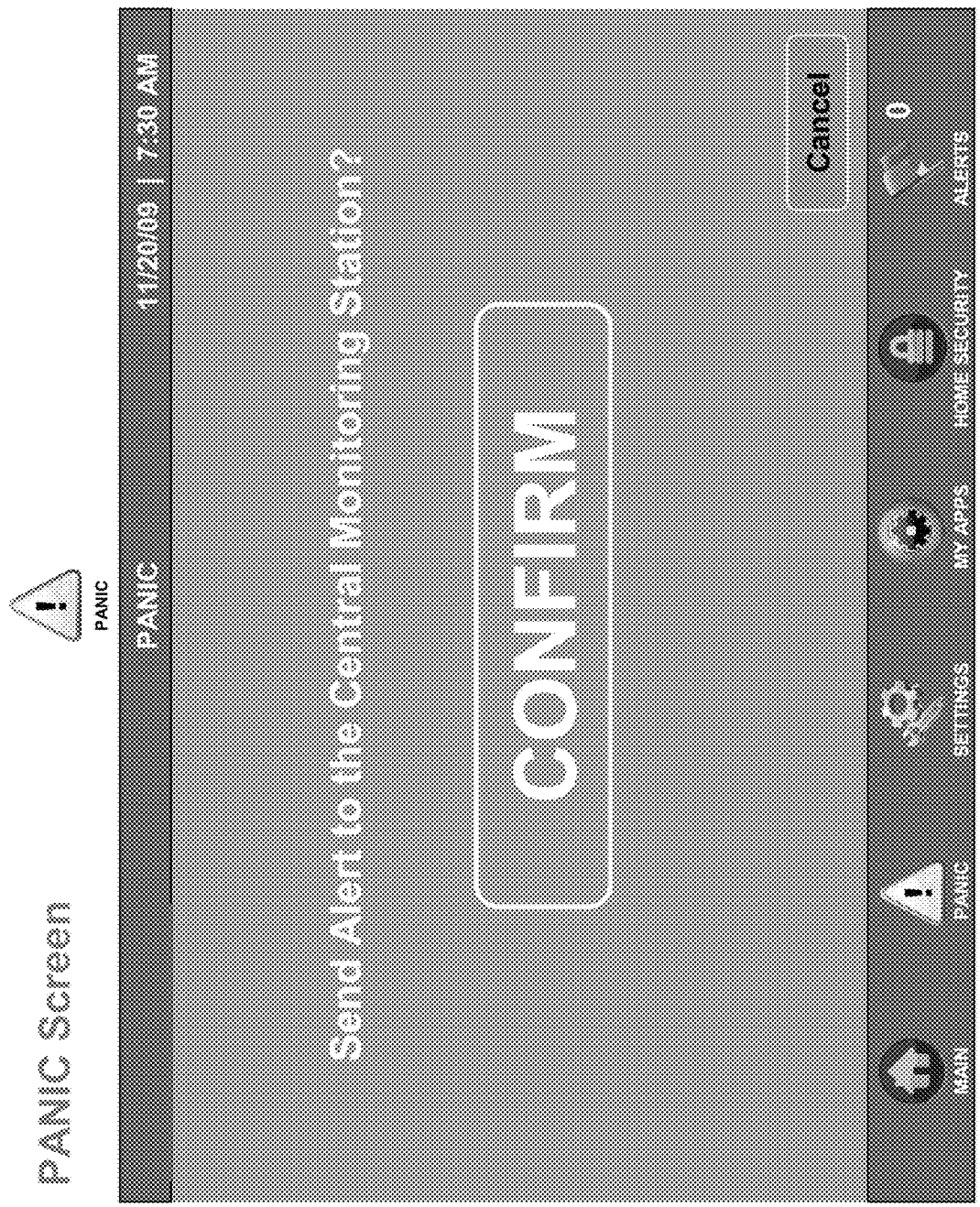
FIGS. 10A-B illustrate an example of an application for implementing various features of the disclosure.
Figure 10B:
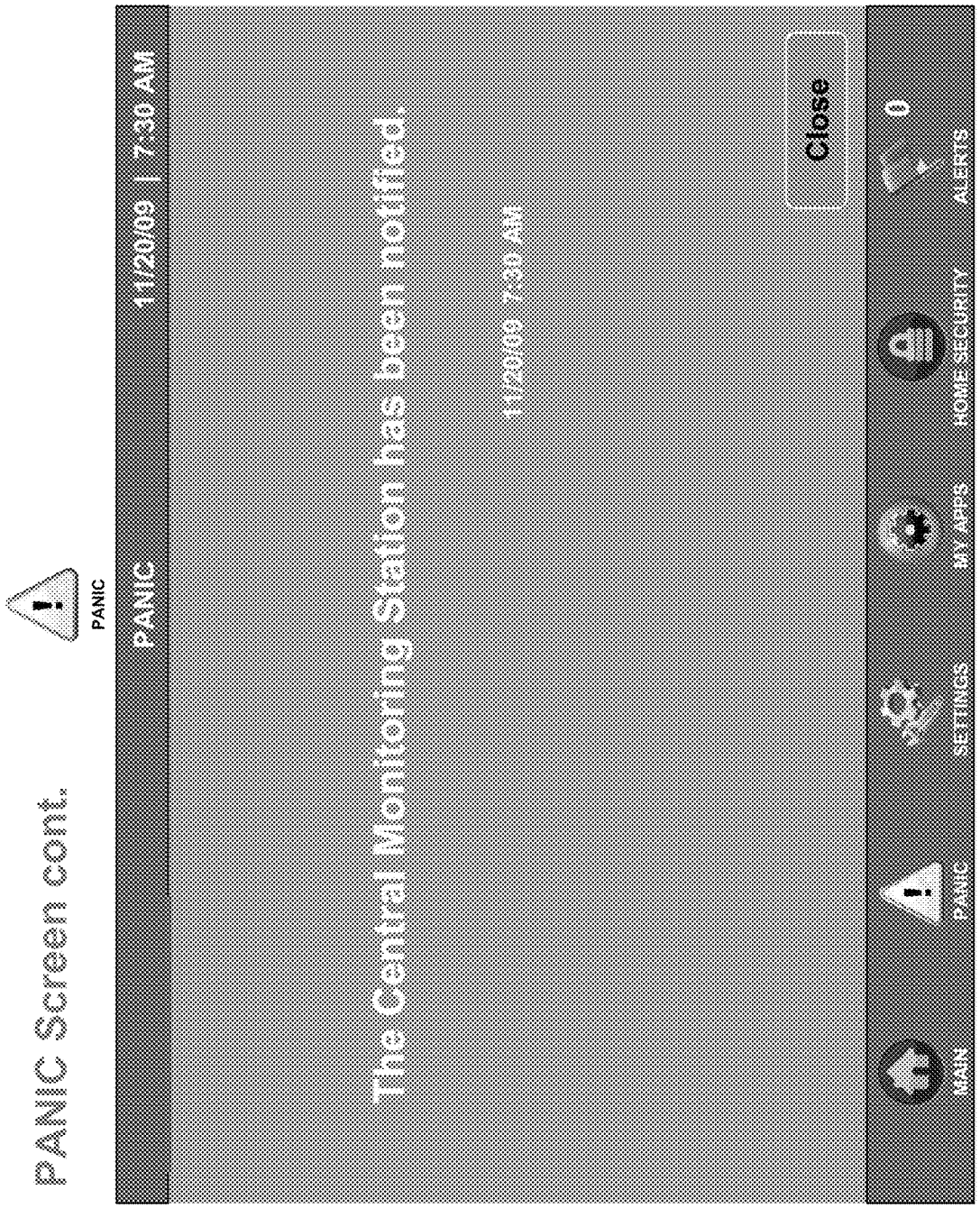

In the case of home security, the application might detect a break-in at a window 118, the window contacts the system which reports the notification on-site, updating a display 303-304 and, optionally, collecting user input 305. See FIG. 10A, which shows an optional input from the user confirming that the off-site service, a security central monitoring station, should be alerted. The off-site service may be updated to indicate the window break. See 314-315. The off-site service can perform any needed activities related to home security such as contacting police, insurance agencies, and glaziers. The off-site service can deliver a push notification to the user to indicate that the home security application has responded to the alert. See FIG. 10B.

Optionally, content that originates from an on-site service may be communicated off-site for processing 314-315. For example, an appliance may deliver one type of content directly to the system for the user's attention and a second type of content to an off-site service via the system. The first type of content contains information relevant to the day-to-day operation of the appliance and the second type of content may be related to longer term appliance management. For example, a refrigerator may inform the user that a good such as produce or a dairy product is nearing the end of its shelf-life or is in low amount. The refrigerator may also inform the refrigerator vendor that a fault has been detected. The refrigerator vendor, as an off-site service, can determine further action required to address the fault. Various responses are possible. The off-site service can determine whether the fault can be addressed remotely. If the fault can be addressed remotely, the off-site service can communicate the solution to the appliance. Optionally, the off-site service may inform the user via the system and/or seek user approval before implementing the solution. If the fault cannot be addressed remotely, the off-site service can inform the user of the issue by sending a message for local display (e.g., in step 304). Optionally, if the system is under warranty, the off-site service can dispatch an engineer.

Some applications enhance productivity by centralizing information from other applications. For example, a calendar application presents content to the user organized according to time. Entries to the calendar may be made by the user, or by other services, provided the services have been given privileges to input content to the calendar application. Accordingly, a benefit of the integrated nature of the system in the above example is that the off-site service can provide dates and times when an engineer is available and allow the user to select, via the user interface, a preferred time. The selected time is then inputted to the calendar application without further user interaction.

Services may interact with ancillary services that provide additional related functionality which work in concert to provide the user greater convenience and efficiency. For example, home security services may co-ordinate with an insurance company to alert a user's insurance company to a break-in and with a police force to promptly dispatch a patrol.

Other applications that share a common function may also integrate information from multiple parties. For example, a coupon application may deliver offers for discounted items and services from multiple coupon vendors. The services may also send notifications to related applications. For example, coupon notifications may be delivered to a calendar application as well as a coupon application. In some embodiments, the coupon application directly displays to the user when a coupon will expire. In other embodiments, expiration dates can be presented in the context of the calendar application. Advantageously, coupons are automated and digital, providing for greater consumer adoption because they need not be clipped or printed. The system will automatically notify the user of available coupons that the customer has indicated interest in receiving. If a user selects a coupon, it may be sent to a user's customer loyalty card for the participating retailer for redemption at point of sale. If the coupon expiration date is reached, the coupon is automatically removed from the system.

Delivery of content from a third party may be periodic on a timed basis or may be in response to a triggering event. Delivering content in response to triggering events is particularly advantageous to the user. Triggering events include any event where providing timely knowledge of the events occurrence to a user would be welcomed. Some triggering events may require urgent action. For example, activation of a house-security system indicating the presence of a fire, a burglar, or similar event requires an immediate response. An advantage of the system is the ability to send content to multiple locations.

The content may be context-dependent. For example, different content may be delivered depending on whether the user-device receiving the content is located in the home or outside the home. While some devices are substantially permanently located in the home, others are normally carried with the user (PDAs, cell-phones, tablet computers, and the like, for example). Because a device's location can be communicated to a server, the third party may provide location-appropriate responses. For example, during a break-in, a home security service can determine the location of mobile devices. If the mobile device location corresponds to the same location as the break-in, an urgent alarm can be sent to a user's mobile device or other registered device. Such alarms have particular use during burglar entry into the home in the night. Further, the service may alert the police station to the break-in and the alert may also inform the police that the house is currently occupied.

By integrating locational awareness of multiple devices, more sophisticated responses may be achieved. For example, during a break-in at home, if parents are out at a meal while children are at home, the system can assess the locations of mobile devices and determine that children are home alone, or with a babysitter, during a break-in. The system can then send urgent alerts to the parents and to the police. A user is comforted by knowledge that emergency services, such as the police, fire brigade, and ambulances can provide rapid and appropriate responses to emergency situations.

Figure 7A:
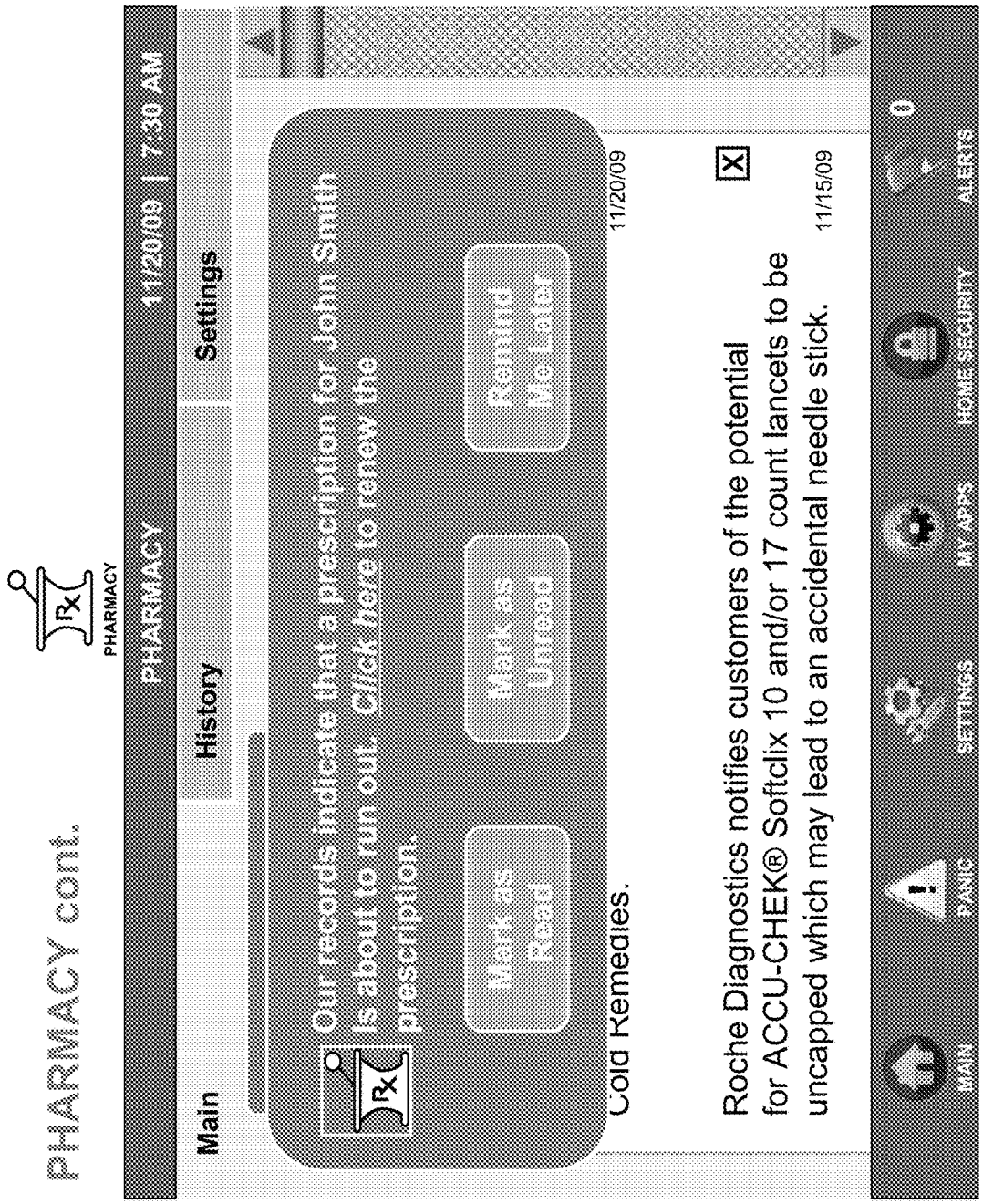
FIGS. 7A-D illustrate an example of an interface that may be used to implement features of the disclosure.
Figure 7B:
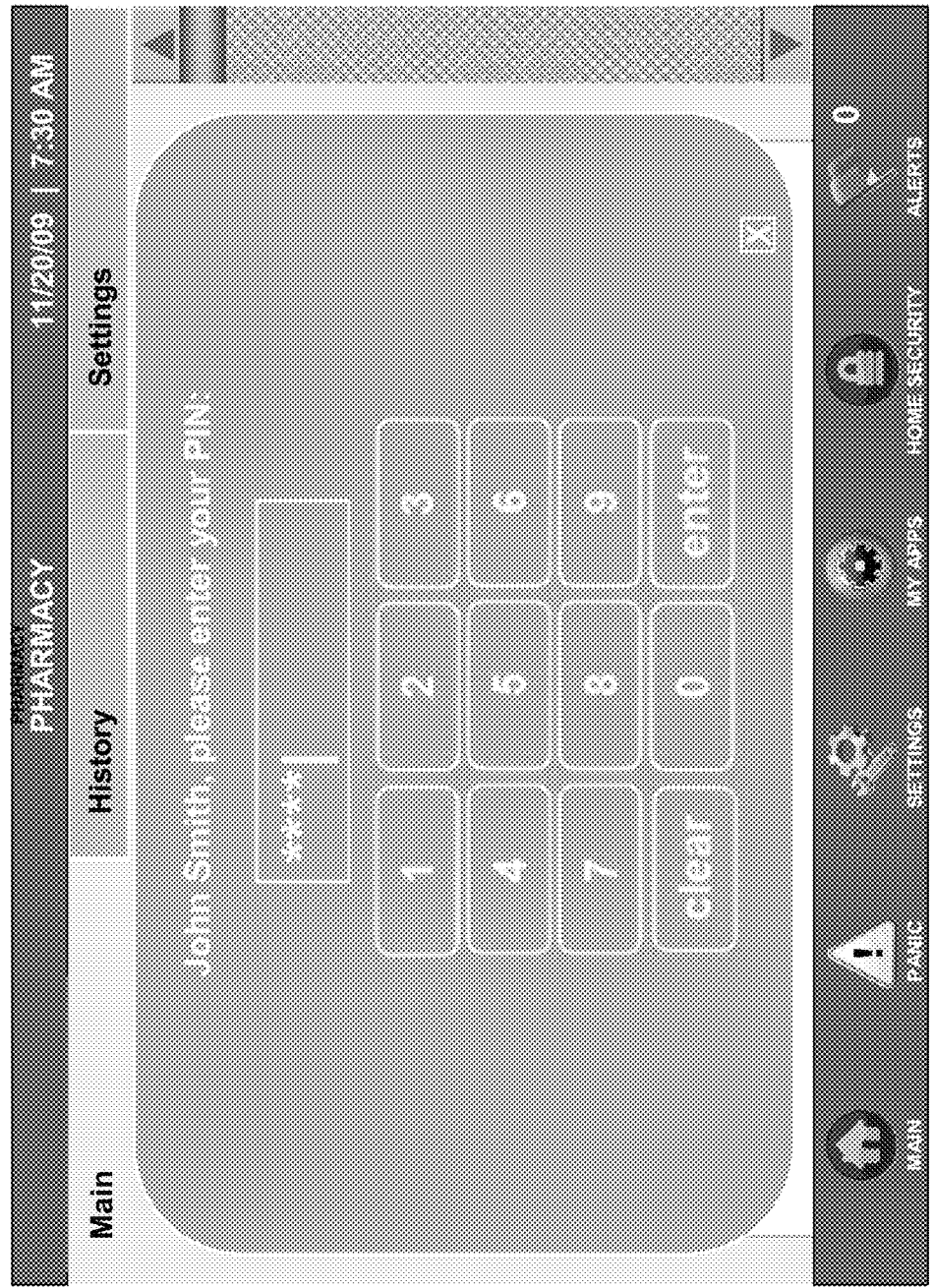
Figure 7C:
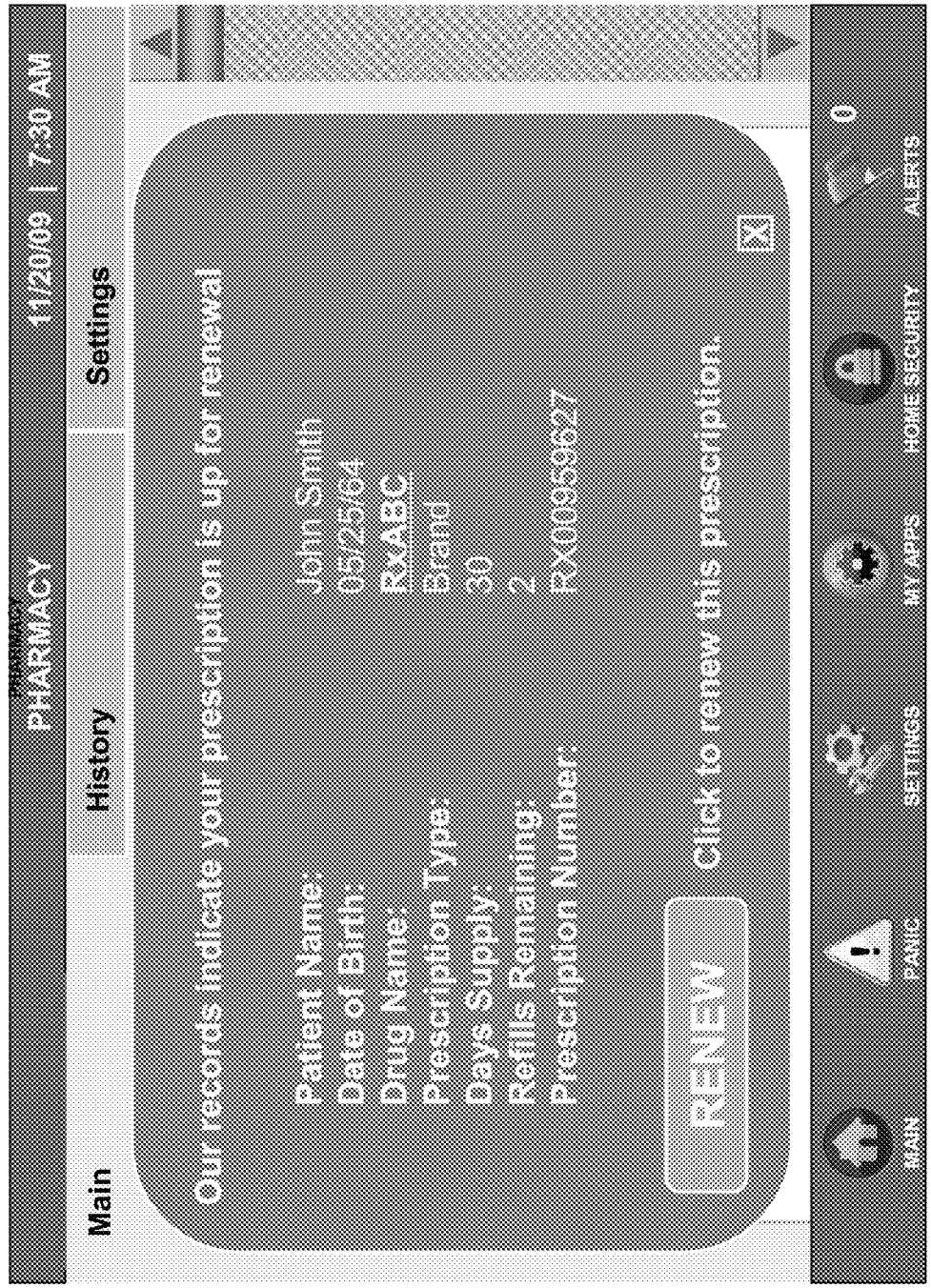
Figure 7D:
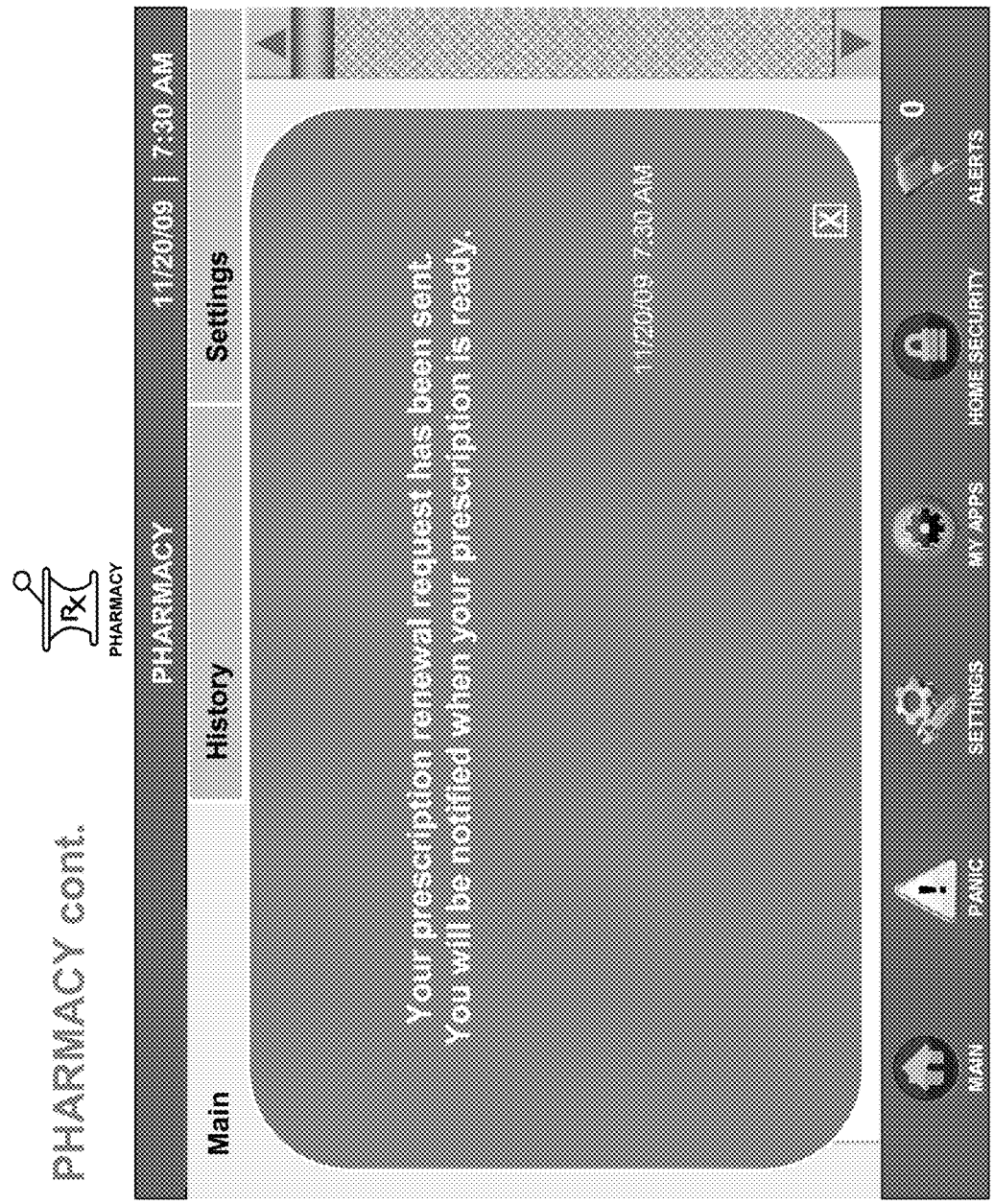
Figure 8:
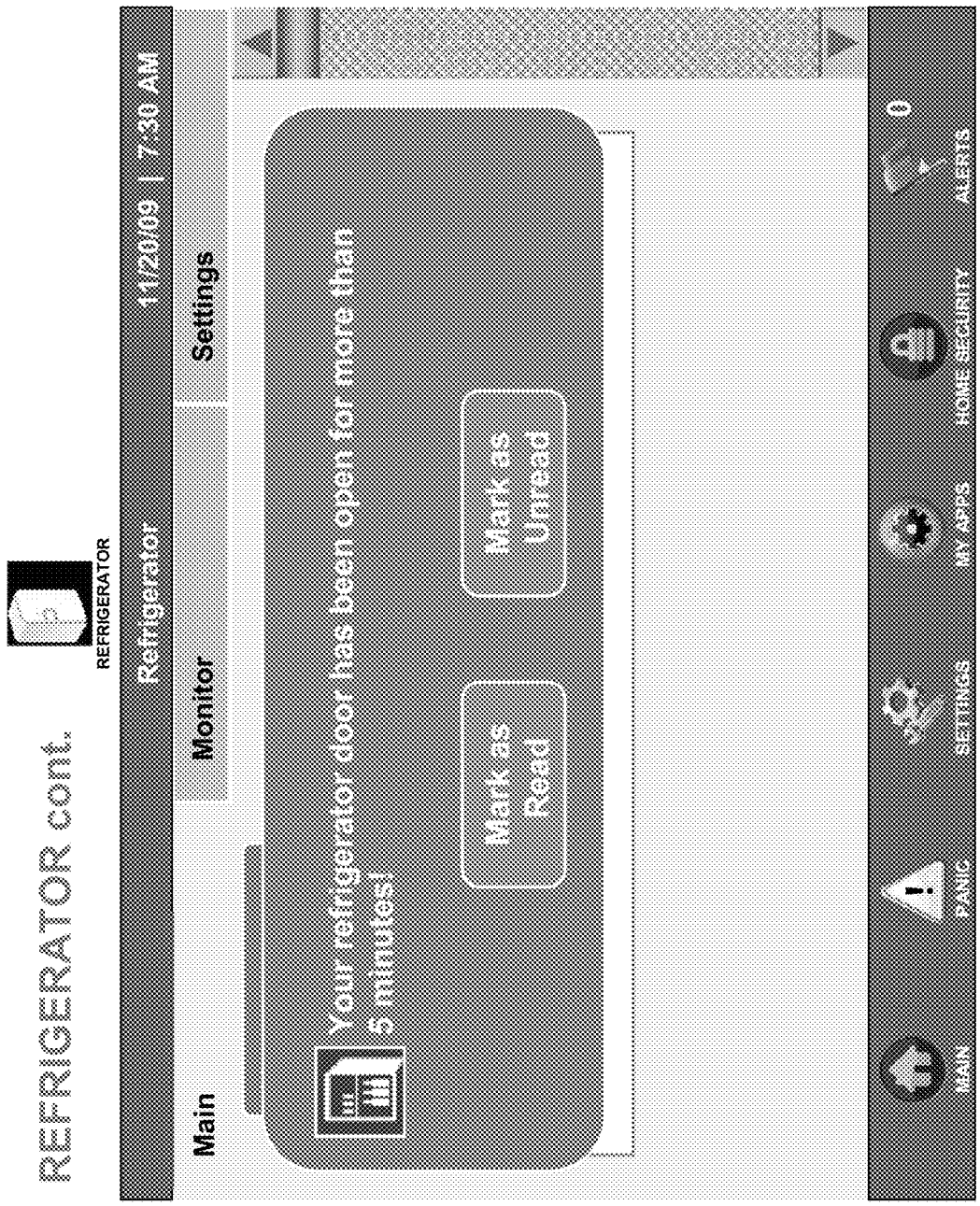
FIG. 8 illustrates an example of an application for implementing various features of the disclosure.

Other triggering events may require less urgent user responses. For example, after a visit to a dentist or physician, a user may need to take further action such as ordering medicine or making an appointment to see a specialist. The physician may enter the prescription information directly into an application that communicates to a pharmacy. The pharmacy application can subsequently inform the user when the prescription is ready for pick-up. FIG. 7A-7D is an illustration of user interface pages implementing aspects of a pharmacy application. FIG. 7A illustrates a display page updated in response to an off-site-sourced alert from a pharmacy application. The application alerts the user to an impending expiration of a prescription. The user can then enter a personal identification number (FIG. 7B) to enter the pharmacy application and renew the prescription. FIG. 7C. Optionally, the user may have previously instructed the pharmacy application to renew prescriptions automatically. After the user confirms the renewal the renewal request is communicated to the off-site service and the display is updated to acknowledge that the communication was sent. FIG. 7D. Optionally, the display may be updated in response to a notification from the off-site service that the request was received. FIG. 8 is an illustration of displaying content from a notification received from a refrigerator informing the user that the refrigerator door has been left open.

Additional triggering events can be inputted to the system by other third parties such as schools, colleges, and the like. Schools can input reminders and information about projects due-dates, parent-teacher association meetings, swim meets, and the like.

Figure 9:
FIG. 9 illustrates an example of an application for implementing various features of the disclosure.

Other services may be periodic; for example, alerts about daily weather and traffic reports (FIG. 9) and the like may be presented to the user via a user interface on a display device. In the morning, a display device stationed near the bed provides relevant information to the user on waking.

Figure 12A:
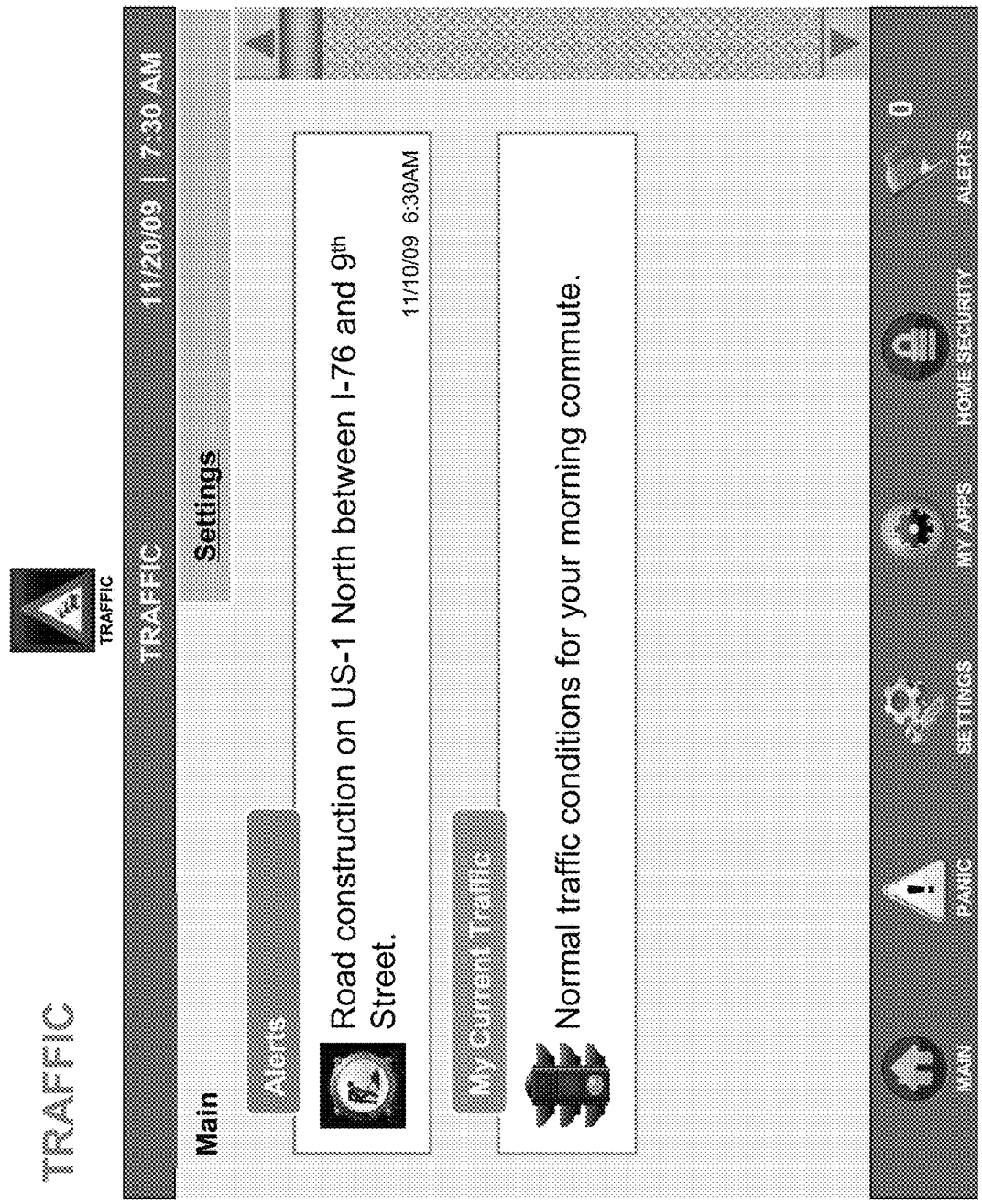
FIGS. 12A-B illustrate an example of an application for implementing various features of the disclosure.
Figure 12B:
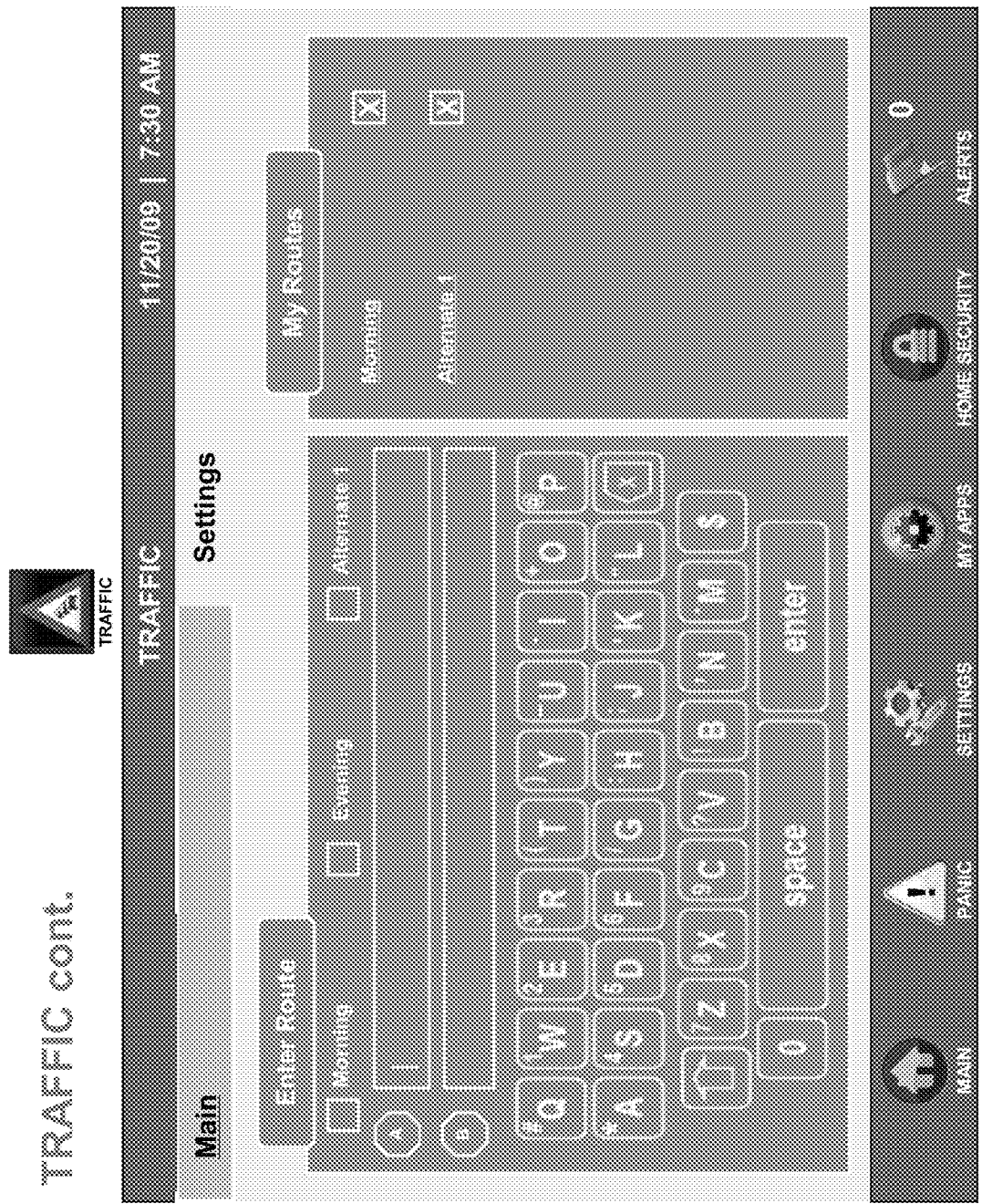

In an aspect of the disclosure, a traffic report application is aware of a driver's commute. In some aspects, the user inputs the information into the system. See, for example, FIGS. 12A and 12B. In other aspects, an application acquires information about the user automatically using location awareness ability such as GPS built-in to a device, such as a cell phone, for example. For example, work-related commutes typically use the same route repeatedly. See FIG. 12A. Route information can be supplied from the device to the system, which stores the route and later provides morning traffic reports to the user on wakening. The user may also input alternative routes that are more preferred than other, less-preferred routes. See FIG. 12B. The application can integrate the data supplied from a device to deliver traffic reports not only for the most-used route but also for most-preferred routes. Routes can be ranked based on user-inputted preferences or as most-used routes and traffic reports about the routes can be delivered based on the ranking.

The user interface is organized to provide the most relevant information to the user on the main screen, which is the first screen encountered by the user on a device. Information is organized in any suitable way. Typically, service information is contained in an application that is executed by the user. Applications sharing common themes may be grouped together on the same screen.

Figure 6:
FIG. 6 illustrates an example of an interface that may be used to implement various features of the disclosure.
Figure 11:
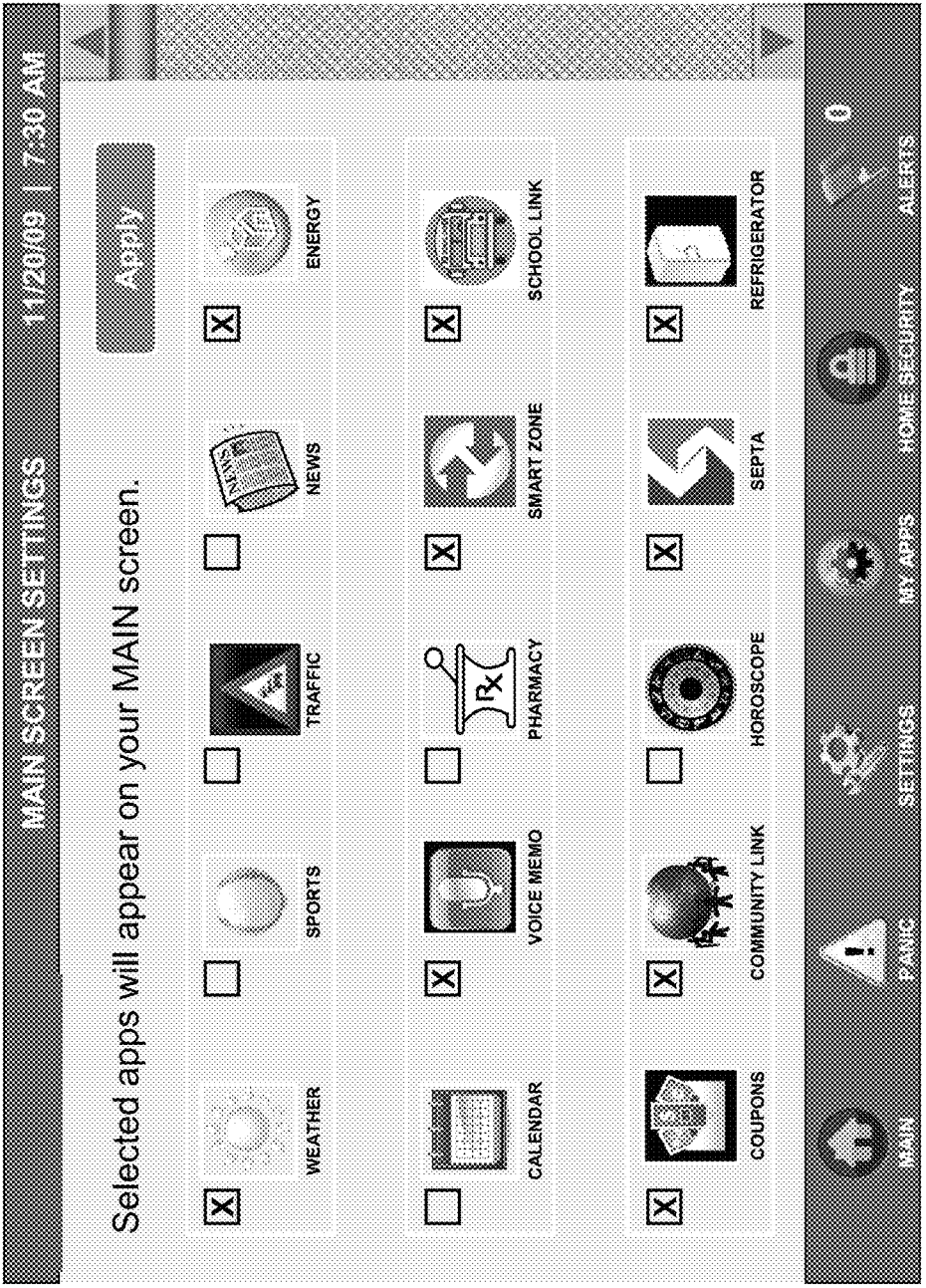
FIG. 11 illustrates an example of an interface page that may be used to implement various features of the disclosure.

Enhanced user convenience and efficiency is provided by centralization of the most-relevant information on the main screen of the user interface. An example of a user interface is shown in FIG. 6. FIG. 6 illustrates information that may be presented to a user in an inbox of the interface. FIG. 6 illustrates a weather inbox, an energy usage inbox, a shopping list inbox, a combined email and voicemail inbox and a calendar function inbox. In addition, icons linking to other pages are illustrated on the bottom of the user interface. Additional pages may be displayed in response to the user selecting icons correspond to particular applications or functions. A user interface has a default organization. A user may also custom-modify the user interface for personal preferences. FIG. 11 shows a page where a user can select applications to appear on the main page (e.g., FIG. 6). The default and customized interfaces may be the same or different for each device.

Applications sharing a common theme may be grouped together on a particular screen. For example, one screen may group Fitness applications, another screen may group Finance applications, and yet another screen may group Entertainment applications.

Grouping of applications into themes or onto particular screens may be automatic or may be user-controlled. For example, the system may contain a variety of default themes and an application may contain a flag, which has the effect of automatically grouping the application into a particular theme. Alternatively, or in addition, the user may group one or more applications into a particular screen.

The user interface may also be modified for each user's aesthetic sense. For example, the color scheme may be modified. The region on a particular screen where content is delivered may be modified. Optionally, the user interface may provide screensaver options for visual pleasure. For example, while not actively being used, the user interface may be blackened to lower energy use or may present pictures pleasing to the user. Thus, the user interface may function as an electronic photo album providing esthetic value in addition to functionality.

In aspects of the disclosure, the system provides for delivering or presenting notifications to the user on a prioritized basis. A dynamic ranking system may be used to prioritize one notification over another, allowing the system to present to the user the notification having a higher rank value. By delivering notifications to the consumer on a prioritized basis, the system reduces delivery of less important and/or less relevant notifications. In addition, the system permits modifying the priority of notifications, allowing the user to teach the system which notifications are more important to the user. Advantageously, the system may be iterative, allowing for repeated comparisons of rank values to present the notifications with the highest ranks to the user.

To facilitate assigning rank values to notifications, a notification prioritization scheme (e.g., a database identifying prioritization and delivery parameters) may be defined to establish how notifications will be prioritized, and how prioritization will affect the delivery of a notification. For example, the scheme may identify the various ways that a notification can be conveyed to a user. One way is through the display described above, while other ways can include audio alerts, forwarding of notifications using email, voicemail, text message, etc., and any other desired notification conveyance method. These methods can also be subdivided. For example, the scheme may identify different regions on a display screen, and may indicate that notifications are to appear across the top of the screen in predefined locations, and that they be arranged in order of descending priority from left to right.

The scheme may indicate that multiple notification attempts should be made for messages exceeding a predetermined threshold. For example, extremely high priority messages may initially be displayed in the left-most region on the display, but the system can also generate one or more additional messages to try and ensure that the recipient receives the notification. The additional messages can be, for example, a phone call to an alternate number or person that the primary recipient has designated as a reliable proxy, a forwarding email or text message, etc.

The prioritization scheme may also indicate how notifications are to be prioritized or classified. The prioritization classification information can use a variety of factors to arrive at a priority ranking for a given notification. One factor may be the identity of the sender and/or the recipient. For example, incoming notifications from a close family member might automatically be given a priority ranking of 80, while incoming messages from a stranger or a telemarketer may be given a default priority ranking of 10, which is of much lower rank (and therefore less of a priority) than 80. Similarly, incoming notifications from a home security system, local fire or police departments, weather alert service, or hospitals may be given a higher default ranking due to their likelihood of conveying important and time-sensitive information.

The identity of the recipient can also be a factor. Incoming messages destined for a parent in a household may be given a higher default ranking than an incoming message destined for a child or to some other entity (e.g., "Resident at this address," or to a family pet, etc.).

Another factor can be the notification or message type or content. For example, incoming email messages may be given lower priority than incoming voice mail messages. Messages containing certain types of content (e.g., keywords, sounds, codes, etc.) may also be given a predetermined priority ranking. For example, messages marked with an "urgent" identifier code can be given a higher ranking, while messages marked with a "not urgent—at your convenience" identifier code can be given a lower ranking.

Another factor may be geographic location of a recipient or sender. For example, if a recipient is presently away from home, then an incoming notification directed to that individual may be given a lower default priority than if they had been home. Conversely, notifications directed to individuals who are at home may be given a higher default priority. The system may be made aware of an individual's presence in a variety of ways, such as through logging in, camera identification, GPS (global positioning system) receiver in a smartphone reporting its location, etc. The sender's location can also be a factor. If the notification is a message from an individual who is on a highway, or in a hospital, then that notification can be given a higher priority than if the individual were located in a shopping mall.

Another factor may be user history for prior messages having a common characteristic such as sender, recipient, content, type, etc. If a user routinely ignores incoming messages having certain characteristics (e.g., messages for an online shopping site, text messages received at 2 am, etc.), then the system may dynamically modify the prioritization scheme to reduce the default priority for future incoming messages having those characteristics. Conversely, if users routinely retrieve a low priority message from a particular sender, then future incoming messages from that sender can be given a higher default priority ranking.

The factors may be combined as well. For example, sender identity, location and notification content can be combined. A sender who is located at a shopping mall, and wishes to send a message containing the words "sale" or "price", may have a higher priority since the message may be one requesting permission to purchase an item. That same message, if sent while the sender is at home, could be given a lower priority ranking since a reply is not likely to be as urgent.

The various factors above can be weighted and combined in any desired fashion to arrive at a ranking order of pending incoming notifications. For example, some factors may have a numeric value (e.g., the 80 or 10 values noted above as examples) that are added or subtracted from a notification's default score (which can be set based on any of the criteria, such as message sender). The scores may also be normalized to arrive at the ranking order.

The factors may be initially defined by the user. For example, the user may log in to the life management server from a personal computer or other device, and may be presented with a display listing the various criteria that the server is able to track for notifications. The user may then enter default ranking scores for any desired criteria or combinations of criteria.

Figure 5:
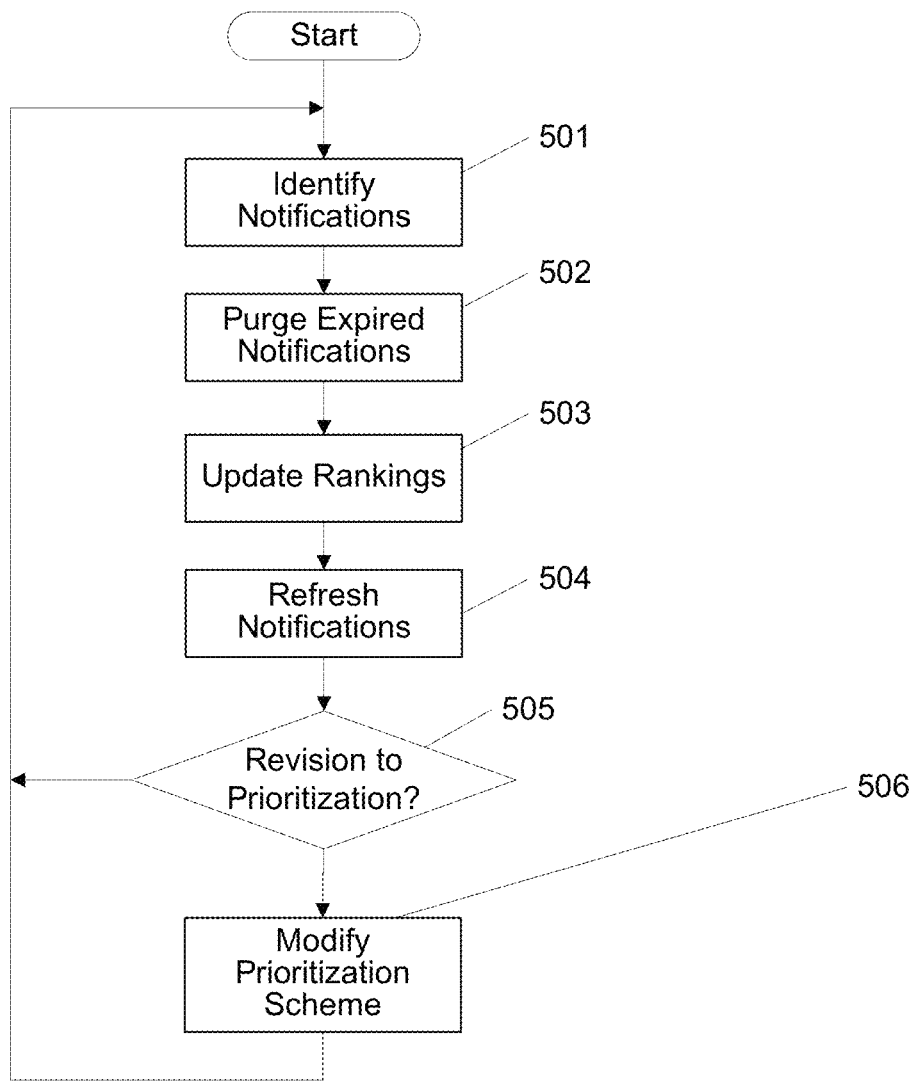
FIG. 5 illustrates an example process for a notification.

FIG. 5 provides an example of the life management server updating a notification display, which can be performed by the server in parallel with the process shown in FIG. 3, or at predetermined intervals (e.g., once every minute). In step 501, the server may initially identify all notifications that have been received and have not yet been deleted from the server's list of notifications. In step 502, the server may delete notifications that have expired. A notification may expire for a variety of reasons. Some notifications may include a time-to-live value indicating an amount of time that the notification will remain active, and at which time the notification may be discarded as no longer relevant. For example, a weather alert containing a tornado warning lasting until 10 pm tonight may include a time-to-live parameter indicating that the notification should be deleted tomorrow morning at 4 am. The notification prioritization scheme may also indicate time-to-live values for messages meeting certain criteria, as chosen by the user.

In step 503, the server may process the remaining notifications to re-evaluate their rankings. A notification's ranking may have been initially assigned when the notification arrived, but its ranking can change based on the various weighting factors discussed above. For example, the current time may indicate that a previously urgent notification is no longer as urgent, so its time-based ranking factor may assign a lower priority value now that the time is different. Similarly, a change in a recipient's or sender's geographic location may change the notification's priority—for example, a notification may have initially received a lower ranking because the recipient was not home, but upon the recipient's arrival at home, the notification's new ranking may be higher if the GPS factor was used. As another example, a sender who sent a message from the shopping mall regarding possibly purchasing a sale item may no longer be at that store, and as such, the message is no longer as high a priority as it was before.

In step 504, the re-ranked notifications may then refresh the notification mechanisms (display areas, sounds, external messaging, etc.) to reflect the current ranking of notifications. As a result, the notifications may be distributed among the available notification mechanisms identified in the scheme, resulting in a rearrangement and/or change of the notifications that are displayed on the screen, and any other desired notification actions. For example, notifications may be shifted in the notifications area such that a different notification now occupies the highest priority spot, while other notifications may be rearranged and/or removed or added to the first page display. Additional text messages or audible alerts may also be sent to reflect the notification's change in priority. The re-ranking and rearranging of notifications can occur even before the notifications have been accessed by a recipient user, and can be done automatically based on changed conditions, without recipient user input.

In step 505, the server may check to determine whether a revision to the prioritization scheme is desired. Such a revision can be initiated by the user's request (e.g., a user can view a notification, and press a "revise priorities" button to indicate a desire to adjust the priority of the notification), or automatically (e.g., if the system determines that a particular type of notification has been ignored for longer than a predetermined amount of time, then the system can initiate a process to change its prioritization scheme to lower the priority of future notifications having the same characteristics). If a revision is desired, then in step 506 the desired revision can be implemented. This implementation can include displaying to the user (for user-initiated revisions) the details of the prioritization scheme discussed above, with options to adjust parameters (e.g., raising/lowering values placed on the different factors, adding/removing/editing factors, etc.). For simple revisions, the display can include a "demote" or "promote" button while viewing a notification message to decrease or increase the priority given to further notifications matching the characteristics of the current notification message. In such situations, the server can normalize a decrease in priority to all of the factors that led to the viewed message receiving the priority that it received. So, for example, if an incoming notification was given a "75" priority rating because of 3 distinct factors (e.g., geographic location of sender, message keyword and time of day), then the "demote" button can result in decreasing the overall priority by a predetermined amount (e.g., 12), and that amount can be evenly divided among the various factors.

Revisions to the prioritization scheme can be automatically initiated by the server. As noted above, if a notification is not accessed by a recipient user for a predetermined amount of time (e.g., 10 hours), then the server can automatically adjust the prioritization scheme to de-emphasize the factors that led to that notification's current priority. Conversely, a prioritization scheme factor can be increased if notifications having a particular characteristic or characteristics are consistently accessed quickly. For example, if notifications from a school principal's office and mentioning a child's name (two characteristics that may be present in the prioritization scheme) are always accessed by the recipient within 15 minutes of their receipt, then the server may determine that the priority of messages from the principal should be increased, and may adjust the prioritization scheme to increase the priority given to future notifications from the principal's office mentioning the child's name.

In some embodiments, the various notifications can be actively retrieved by the server. For example, a user may identify a particular Internet site (e.g., a school announcement web site for a family's child), and may request that the server automatically scan the website and generate a notification when a new announcement is posted on the site. The user can specify certain keywords in the announcements, and can assign different priorities to them. For example, announcements with terms like "weather", "canceled", "delay", or "closed" may be given a higher priority than announcements with terms like "fund raiser" or "yearbook."

Each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
    receiving, by a first computing device, at least two notifications associated with a first user device, each of the at least two notifications comprising a plurality of characteristics;
    determining, by the first computing device, a first service associated with a first notification of the at least two notifications;
    determining, using a prioritization scheme, one or more default priority values for each of the at least two notifications;
    determining a history, of a first user of the first computing device, of acknowledging prior notifications that comprise the plurality of characteristics;
    changing, based on the history, the prioritization scheme, wherein the changing the prioritization scheme comprises changing a default priority value for a type of notification that comprises the plurality of characteristics;
    after changing the prioritization scheme, receiving a third notification, wherein the third notification is the type of notification that comprises the plurality of characteristics;
    generating, by the first computing device, a message, associated with the first service, for a user of a second computing device associated with the first user device; and
    transmitting, by the first computing device, the message to the second computing device.

2. The method of claim 1, wherein the receiving the at least two notifications further comprises:
    receiving, by one or more applications executing on the first computing device, the at least two notifications, wherein the one or more applications are configured to update a notification of the at least two notifications that corresponds to an on-site service and an off-site service.

3. The method of claim 2, further comprising:
    defining a set of application-specific rules to apply to the at least two notifications,
    wherein the prioritization scheme is based on the defining the set of application-specific rules.

4. The method of claim 1, wherein the changing the prioritization scheme is further based on one or more user inputs associated with the one or more default priority values.

5. The method of claim 1, wherein the determining, using the prioritization scheme, the one or more default priority values for each of the at least two notifications further comprises:
    determining a time-to-live value associated with a second notification of the at least two notifications; and
    after determining the time-to-live value, discarding the second notification after a duration associated with the time-to-live value.

6. The method of claim 1, further comprising causing display of the at least two notifications based on the one or more default priority values in multiple formats.

7. A method comprising:
    receiving, by a first computing device, at least two notifications corresponding to a first service associated with a first user device;
    determining, by the first computing device, that a first notification of the at least two notifications comprises a request for a first user input;
    assigning, using a prioritization scheme, one or more priority values to each of the at least two notifications;
    changing the prioritization scheme based on a change in location associated with a first user of the first computing device;
    causing removal of display, by the first computing device and based on the changing the prioritization scheme, of the first notification of the at least two notifications;
    subsequent to the causing removal of display, receiving, by the first computing device, the first user input;
    after receiving the first user input, generating, by the first computing device, data associated with the first service; and
    transmitting, by the first computing device, the data to a second computing device associated with the first user device.

8. The method of claim 7 further comprising causing display of the at least two notifications multiple times and in multiple formats.

9. The method of claim 7, wherein the receiving the at least two notifications further comprises:
   receiving, by one or more applications executing on the first computing device, the at least two notifications, wherein the one or more applications are configured to update a notification of the at least two notifications that corresponds to an on-site service and an off-site service.

10. The method of claim 9, further comprising:
   defining a set of application-specific rules to apply to the at least two notifications,
   causing display of the at least two notifications based on the one or more priority values and the set of application-specific rules.

11. The method of claim 7, wherein the assigning, using the prioritization scheme, one or more priority values to each of the at least two notifications further comprises:
   determining a time-to-live value associated with a second notification of the at least two notifications; and
   after determining the time-to-live value, discarding the second notification after a duration associated with the time-to-live value.

12. The method of claim 7, wherein the assigning, using the prioritization scheme, one or more priority values to each of the at least two notifications is further based on at least one of:
   a notification sender location,
   a content associated with the at least two notifications,
   a location of the first computing device, or
   a first user history associated with the first computing device.

13. A method comprising:
   receiving, by a first computing device, a first notification corresponding to a first service associated with a first user device, wherein the first notification comprises a request for a first user input;
   assigning, using a prioritization scheme, a priority value to the first notification; determining whether the first user input is received;
   changing the prioritization scheme based on determining that the first user input has not been received;
   sending, by the first computing device to a second computing device, a second notification based on the changing the prioritization scheme, the second notification comprising a request for the first user input;
   after receiving the first user input from the second computing device, generating, by the first computing device, data associated with the first service; and
   transmitting, by the first computing device, the data to a third computing device associated with the first user device.

14. The method of claim 13, further comprising causing display of the first notification to a first user associated with the first computing device multiple times and in multiple formats.

15. The method of claim 13, further comprising causing removal of display of the first notification in a first location on a display screen.

16. The method of claim 15, further comprising causing display of the first notification in a second location on the display screen, wherein the first and second locations are different.

17. The method of claim 13, further comprising:
   generating, by the first computing device, the second notification; and
   transmitting the second notification to the third computing device.

18. The method of claim 13, wherein the changing the prioritization scheme is further based on determining that the first notification has not been received for longer than a predetermined amount of time.

19. The method of claim 13, further comprising determining an arrival of the first user device to a particular location, wherein the changing the prioritization scheme further comprises causing display of the first notification before a third notification based upon the determining the arrival.

20. The method of claim 13, wherein the first notification comprises:
   a message from a sender, and
   a geographic location of the sender.

* * * * *

UNITED STATES PATENT AND TRADEMARK OFFICE
CERTIFICATE OF CORRECTION

PATENT NO. : 11,030,582 B2
APPLICATION NO. : 16/561872
DATED : June 8, 2021
INVENTOR(S) : Park et al.

It is certified that error appears in the above-identified patent and that said Letters Patent is hereby corrected as shown below:

In the Drawings

Sheet 4 of 17, Fig. 4, Reference Numeral 400, Line 1:
Delete "Bllling" and insert --Billing-- therefor In the Specification Column 4, Detailed Description, Line 48:
Delete "Tomcat/My SQL," and insert --Tomcat/MySQL,-- therefor Column 6, Detailed Description, Line 1:
Delete "DOC SIS" and insert --DOCSIS-- therefor Signed and Sealed this
Twenty-eighth Day of March, 2023

Katherine Kelly Vidal
Director of the United States Patent and Trademark Office